May 7, 1946. W. R. BECK 2,399,619
COAL MINE HAULAGE VEHICLE
Filed May 17, 1944 5 Sheets-Sheet 1
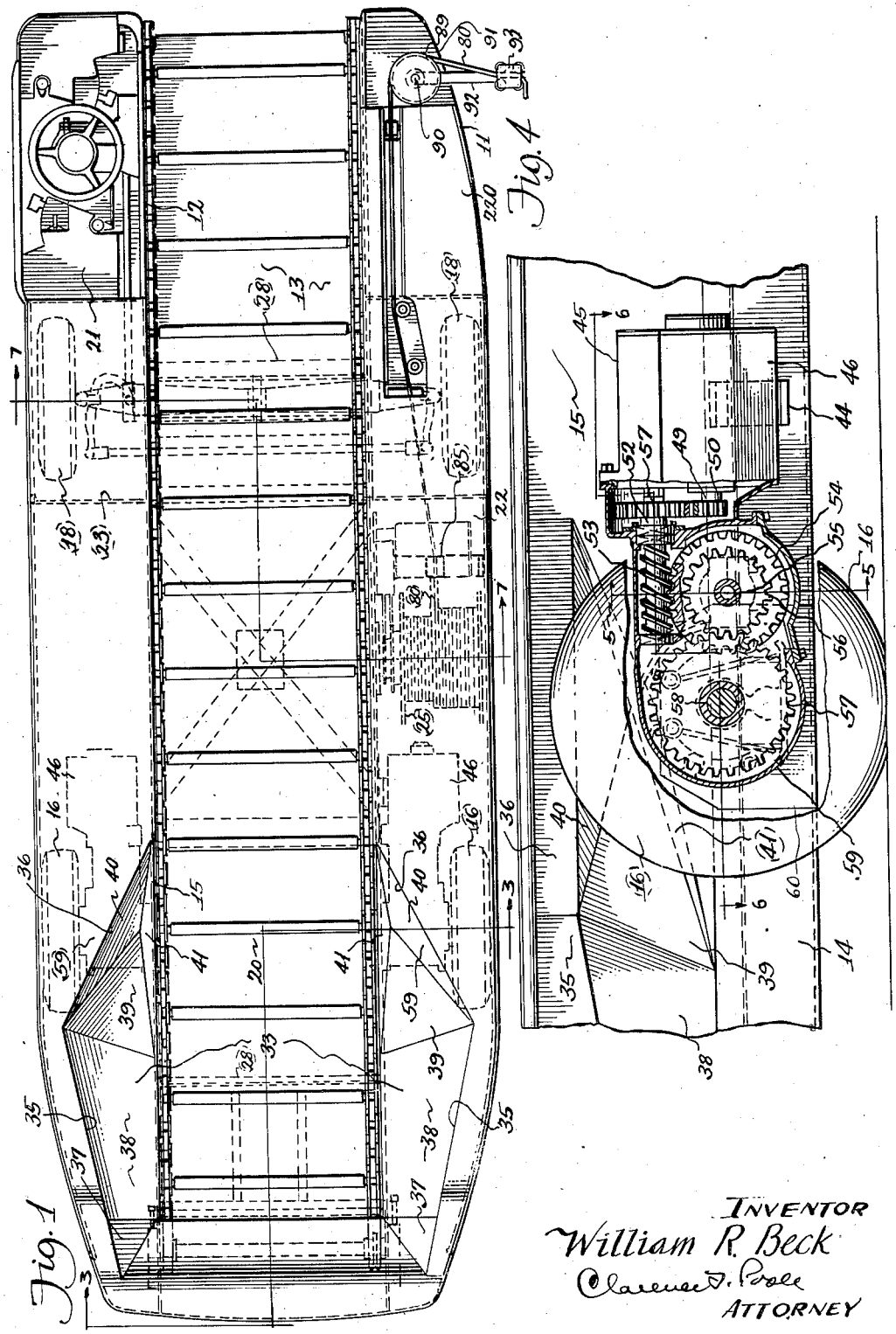
INVENTOR
William R. Beck
Clarence D. Poole
ATTORNEY May 7, 1946.　　　　　W. R. BECK　　　　　2,399,619
COAL MINE HAULAGE VEHICLE
Filed May 17, 1944　　　　5 Sheets-Sheet 2
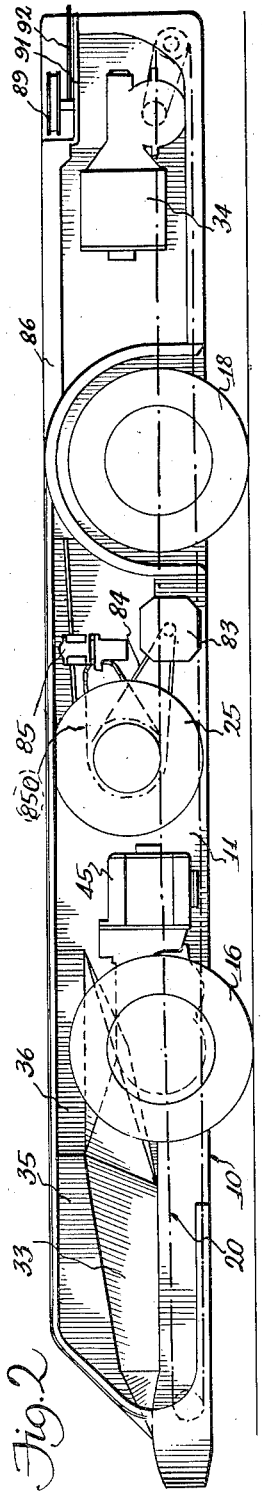
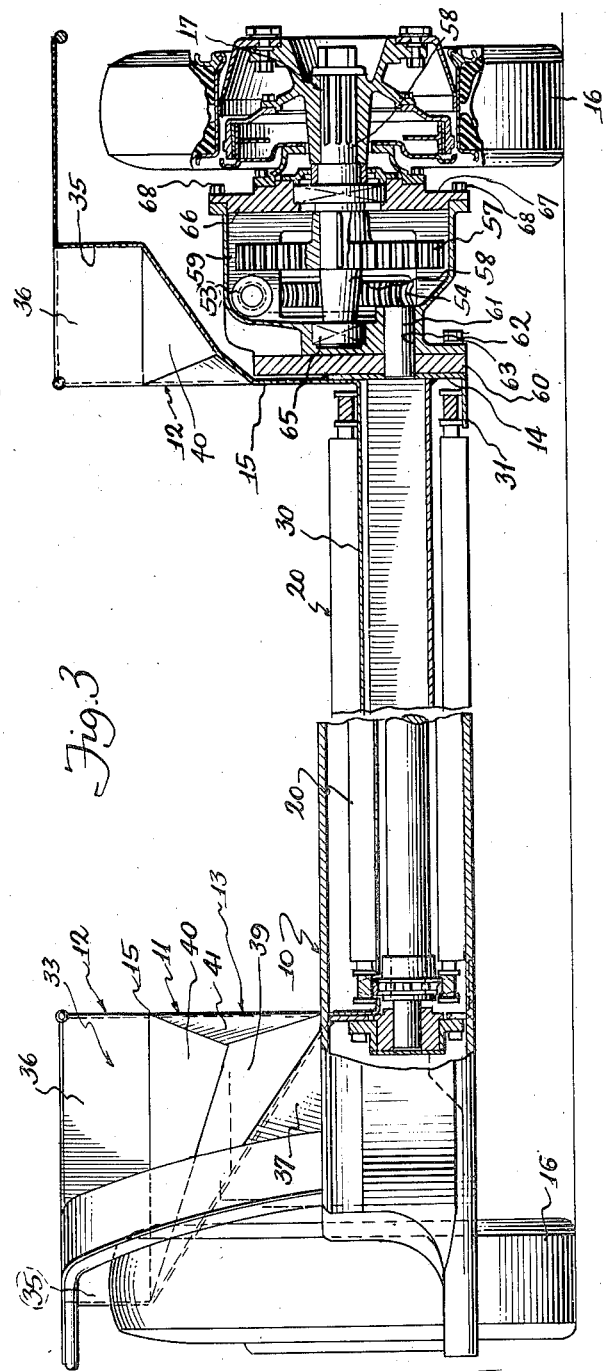
INVENTOR
William R. Beck
Clarence F. Poole
ATTORNEY May 7, 1946.  W. R. BECK  2,399,619
COAL MINE HAULAGE VEHICLE
Filed May 17, 1944  5 Sheets-Sheet 3

INVENTOR
William R. Beck
Clarence T. Poole
ATTORNEY

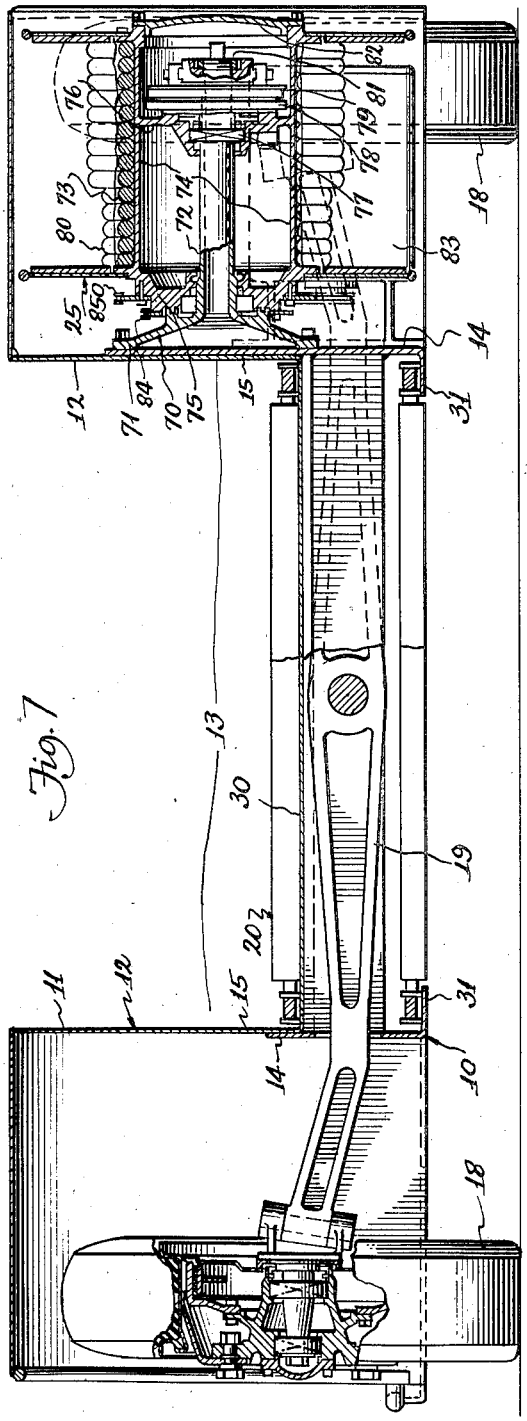

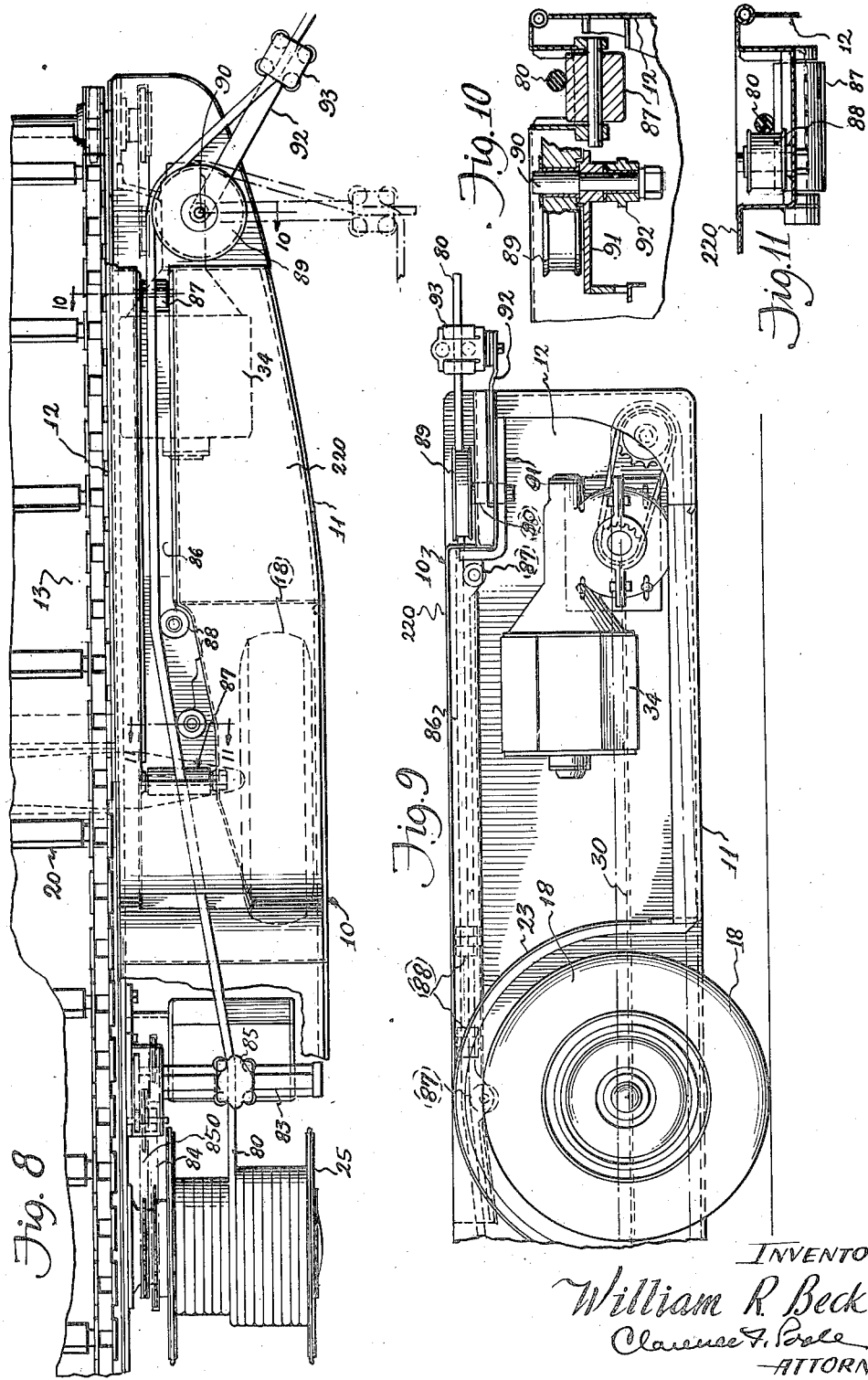

Patented May 7, 1946

2,399,619

UNITED STATES PATENT OFFICE 2,399,619

COAL MINE HAULAGE VEHICLE

William R. Beck, Chicago, Ill., assignor to Goodman Manufacturing Company, Chicago, Ill., a corporation of Illinois Application May 17, 1944, Serial No. 535,903

1 Claim. (Cl. 214—83)

This invention relates to improvements in coal mine haulage vehicles commonly known as shuttle cars or coal buggies, of the kind used for transporting coal from the working face to a main haulage station of a mine.

One of the objects of the invention is to provide an improved form of widened material-receiving hopper at one end of the coal carrying compartment arranged to facilitate the delivery of the material toward the constricted discharge end of the compartment when moved by the bottom conveyer.

I have ascertained by tests that a very considerable amount of extra power is required to drive the bottom conveyer with conventional forms of material-receiving hoppers previously employed, due to a wedging or blocking action of the material as it enters the constricted throat leading to the discharge end of the compartment. In carrying out my invention, I provide the hopper with gradually inclined bottom walls and forwardly tapered side walls, designed to minimize the wedging or blocking action of the material, and at the same time eliminate spillage of material over the side walls adjacent the restricted discharge passage of the compartment. As a result, the power required by the bottom conveyer is reduced to a minimum, while the rate of discharge of the latter is increased.

A further object of the invention is to provide an improved and simplified single-wheel power drive structure for the vehicle including a live drive axle, and gearing connections having minimum space requirements.

A still further object is to provide an improved construction and arrangement of cable reel and pay-off mechanism for vehicles of this character. Other objects will appear as the following specification proceeds.

The invention may best be understood by reference to the accompanying drawings, in which:

Figure 1 is a top plan view of a vehicle constructed in accordance with my invention;

Figure 2 is a view in side elevation of the vehicle of Figure 1;

Figure 3 is an enlarged section taken substantially along the line 3—3 of Figure 1;

Figure 4 is a fragmentary detail view of one of the drive elements of the machine with the parts of the gearing shown in section;

Figure 7 is an enlarged transverse section taken on line 7—7 of Figure 1;

Figure 8 is an enlarged fragmentary detail plan view of one side of the vehicle showing the cable reel and pay-off mechanism associated therewith;

Figure 6:
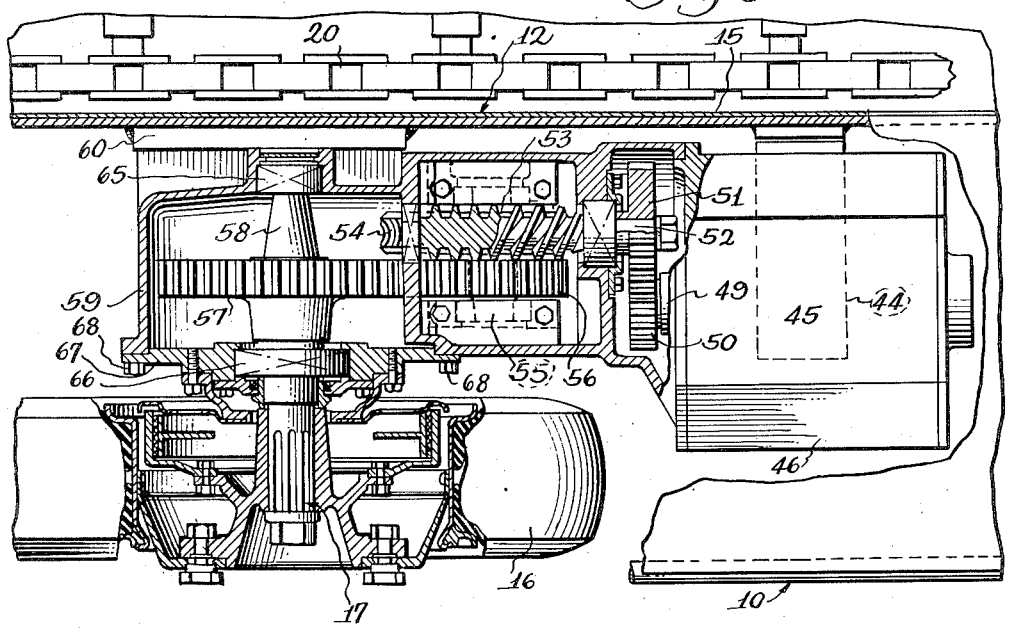
Figure 6 is an enlarged detail section taken on line 6—6 of Figure 4.

Figure 9 is a fragmentary side view of the front end of the vehicle showing details of the pay-off mechanism; and Figures 10 and 11 are detail sections taken on lines 10—10 and 11—11 respectively of Figure 8.

Referring now to details of the embodiment of my invention illustrated in the drawings, the vehicle indicated generally at 10 comprises an elongated chassis 11 including a pair of vertically disposed laterally spaced beams 12, 12 extending the full length thereof and forming the side walls of a coal carrying compartment indicated at 13. Each of said beams consists generally of a relatively heavy plate 14 forming the lower portion thereof, with a lighter plate 15 welded thereto to form a vertical side wall of the compartment 13, as shown in Figures 3 and 7.

The side walls at the front and central portion of the vehicle are upright, but at the rear end of the vehicle are flared outwardly to form a hopper 33, as will presently appear.

The chassis has two rubber-tired drive wheels 16, 16 near the rear end mounted on axle structures 17, 17, which will hereinafter be described in detail. Two rubber-tired steering wheels 18, 18 are disposed near the front end, mounted on an equalizing structure 19, which is substantially similar to that disclosed in my prior Patent No. 2,336,386, so need not be described more fully herein.

An endless chain flight conveyer indicated generally at 20 extends along and forms the bottom of the coal carrying compartment 13 for the full length of the latter, so that the coal can be unloaded mechanically from one end of the vehicle in the usual manner. An operator's platform 21 bearing the usual vehicle control devices, is provided at a forward corner of the vehicle outside of one of the upright compartment walls 12 and forwardly of the adjacent front wheel 18, as shown in Figures 1 and 2.

The side walls 12, 12 have horizontal deck plates 22, 22 extending laterally from their upper edges along opposite sides of the vehicle which form individual wells for the front wheels 18. A cable reel structure indicated generally at 25, is mounted beneath one of the deck plates 22, as will hereinafter be more fully described.

The side beams 12 are cross connected by a plurality of suitable frame members 28 extending between the upper and lower flights of the conveyer 20. The bottom of the compartment 13 is defined by a cross plate 30 extending between the side walls 12, and on which the upper flight of the conveyer is supported. In the form shown herein, the cross plate 30 is made integral with the upwardly extending wall portions 15 of the side walls 12. The lower reach of the conveyer is supported on inturned flanges 31, 31 mounted along the lower edge of the side plates 12.

The hopper 33 is disposed at the rear end of the vehicle and consists generally of a widened portion of the compartment 13 rearwardly of the rear wheels 16 and the portions of the deck plates 22, 22 extending thereover and forming fenders therefor. It will be understood that this hopper is provided in order to facilitate the reception of the coal from the discharge boom of a loading machine. As the hopper is filled, the conveyer 20 is operated as usual by a suitable motor 34 under control of the operator, so as to progress the coal forwardly between the upright side walls 15, at a rate designed to fill the compartment for its full length.

The upper margins of the hopper 33 are defined by opposed vertical walls, which in the form shown herein each consist of two plates 35 and 36 joining each other at a wide angle, and connected along their upper edges to the adjacent horizontal deck plate 22, close to the outer margins of the latter. The said lateral margins of the deck plates 22 are preferably converged toward the rear end of the vehicle, as shown in Figure 1, to facilitate maneuvering of the vehicle in the mine, so the vertical plates 35 of the hopper also converge toward the rear. The foremost vertical plates 36 converge forwardly and are joined respectively with the proximate upright side plates 15, adjacent the upper margins of the latter.

Connected along the lower edges of the upright side plates 35 and 36 are a plurality of plates 37, 38, 39, and 40, all generally inclined downwardly toward the conveyer 20 to form the flaring bottom surfaces of the hopper at opposite sides of the vehicle. The number and relation of these inclined plates to each other may be varied, or the hopper bottom may be formed in part of curved surfaces, if desired, excepting that in carrying out my invention, substantially the entire area of the inclined surfaces of the hopper, as formed herein by the bottom plates 37, 38, 39, and 40, are disposed generally at a relatively flat angle, slightly more than the angle at which the material being handled will slide downwardly by gravity toward the conveyer. Moreover, the forwardly converging surfaces of the hopper, as exemplified by the bottom plates 39, 39, are preferably inclined rearwardly as well as downwardly so as to approach the proximate upright side walls 15, 15 along a forwardly rising plane, as will be seen in Figure 1. In the form shown, elongated plates 41 extend along this rising plane, so as to break the otherwise sharp angle between the upright plates 15 and the bottom plates 39 and 40.

I find that in order to minimize the wedging or blocking action above referred to, the angle of inclination of the hopper bottom should not exceed approximately 10° more than the angle at which the material being handled will slide by gravity toward the conveyer. This angle, which for convenience may be termed the "angle of slide," will be somewhat less than the normal angle of repose of the same material, and will vary not only as to different materials and the smoothness of the surface over which it must slide, but also varies with the same material, depending upon whether it is in lump form or fines, or whether it is wet or dry. I find, however, that the angle of slide of lump coal on a smooth bottom is usually in the neighborhood of 25°, so that for best results in handling run-of-mine coal, the general angle of inclination of the bottom plates of the hopper 33 should be approximately 30°, that is to say, it should be a few degrees more than 25°, but not in excess of about 35°.

From the above description of hopper 33 it will now be understood that the arrangement of the vertical side walls 35 and 36, and the gradually inclined bottom plates, permit the coal which is heaped in the hopper to be transferred by the conveyer into the restricted discharge passage without any blocking or arching action. This objectionable action is common in hoppers of conventional shape, where the restriction is relatively abrupt, and the bottom walls of the hopper are at a relatively sharp inclination, so as to cause the upper portions of coal at opposite sides of the conveyer to move inwardly toward each other by gravity and become wedged or blocked in front of the restricted entrance of the discharge passage. This wedging or blocking effect, especially noticeable when large lumps are being handled, tends to build up a more or less solid arch over the conveyer, so as to exert a definite drag on the latter, and also to reduce the volume of coal delivered to the discharge passage.

Thus, with my improved form of hopper, the vertical marginal walls 35, 36 serve to increase the capacity of the hopper, and also contribute to the arrangement of the gradually inclined bottom surfaces of the hopper so as to overcome any tendency of the coal to wedge or block at the restricted opening of the discharge passage. Moreover, said vertical marginal walls serve to guide the upper part of the coal stream gradually inward toward the discharge passage, while preventing spillage over the edges of the hopper as the coal stream is thus converged.

Figure 5:
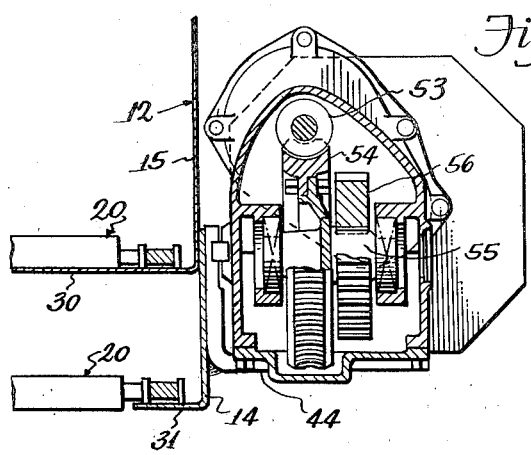
Figure 5 is a detail section taken substantially on line 5—5 of Figure 4.

The drive mechanism for each rear wheel 16 consists of an electric motor 45 in casing 46 disposed longitudinally of the machine and forwardly of said wheel. Said casing is suitably supported on the adjacent side beam 12 as by a bracket 44 shown in Figure 5. An armature shaft 49 of the motor is connected by gears 50, 51, to a shaft 52 having a worm 53 thereon, disposed above the armature shaft. The worm 53 is meshed with worm gear 54 fixed on a stub shaft 55. A pinion 56 is also fixed on said stub shaft and meshes with the drive gear 57 fixed on the live axle 58 of wheel 16.

The entire drive gearing just described has bearing support in and is enclosed by a gear casing 59 which is rigidly connected to the front end of the motor casing 46, and is also detachably mounted on a flat base plate 60 suitably fixed to the proximate beam 12, as by welding, and having a supporting pin 61 projecting outwardly therefrom, as shown in Figure 3. The pin 61 is adapted to fit in an aperture 62 formed in the gear casing 59. The latter casing is secured to the base plate by a plurality of bolts 63.

It will be observed that the live axle 58 has its inner end supported by an anti-friction bearing 65 recessed in the inner face of the gear casing 59, while the outer end of said axle is supported by an anti-friction bearing 66 mounted in a closure plate 67, detachably secured to the outer face of the casing 59 by bolts 68. This arrangement permits the entire wheel assembly, including the axle and its drive gear 57, to be readily dismounted from the casing 59, when desired, by removing the bolts 68 and withdrawing said wheel assembly endwise from said casing.

The cable reel structure 25, mounted on one side beam 12 between the front and rear wheels, includes a base plate 70 secured to the beam 12 as by bolts 71, and having a horizontally disposed spindle 72 forming a support for the reel 73. Said reel comprises a hollow drum 74 with an inner web 75 having bearing support adjacent the base plate 70, and a web 76 intermediate its ends, having bearing support on an anti-friction member 77 carried on the outer end of the spindle 72, as shown in Figure 7. Two collector rings 78, 79 of the type usually employed for carrying the current from the cable 80 on the reel to conductors on the vehicle, are mounted on the outer side of the reel web 76, in position to be engaged by suitable contacts (not shown) fixed on the outer end of the spindle as by a nut 81. The reel drum 74 is enclosed at its outer end by a detachable plate 82.

The cable reel is driven by a motor 83 through a chain and sprocket drive 84, and a suitable tensioning control means (not shown). A spooling device 85 of the usual construction is disposed forwardly of the reel, and is driven by a second chain and sprocket drive 850 extending from said reel, as shown in Figure 8.

The cable 80 is adapted to be trained forwardly from the spooling device through and along a guideway 86 formed in the fender 23 and a deck plate 220 extending over and forwardly of the front wheel. A plurality of horizontal guide rollers 87, 87 and vertical guide rollers 88, 88 may be provided along the guideway 86, as desired. At the front end of said deck plate is mounted a guide wheel 89 on an upright shaft 90, suitably fixed to the vehicle frame as by a horizontally extending bracket 91 (see Figure 10). An extension arm 92, carrying a roller guide fixture 93 at its outer end, is pivotally mounted on the lower end of the shaft 90, so that said arm can swing through an arc of at least 90°, towards the front and side of the vehicle. With the cable 80 passed through the roller guide fixture 93, as shown in Figures 4 and 8, the cable will be automatically projected at a substantial distance from the side of the vehicle whenever the vehicle is moved so that the cable extends rearwardly of the latter. In this way, danger of injury to the cable by fouling with moving parts of the vehicle, is greatly minimized.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claim.

I claim as my invention:

In a vehicle for transporting loose material, a wheel-supported main frame having a material-carrying compartment therealong, and an endless conveyer extending along said compartment and forming the bottom thereof, said compartment including a pair of vertical side walls widened at one end of the vehicle to define a material-receiving hopper, and converging toward a relatively restricted discharge passage of substantially the same width as said conveyer, said hopper having bottom walls inclined inwardly from the bottom of said vertical walls toward said conveyer at relatively flat angles and the said bottom walls meeting the vertical walls of said restricted discharge passage below said converging vertical side walls along upwardly and forwardly inclined angles so as to permit the material to be transferred by said conveyer from said hopper to said restricted discharge passage in a gradually converging stream without substantial blocking of said stream, or spillage of material over the converging vertical side walls of said hopper.

WILLIAM R. BECK.